Sept. 15, 1942.  J. J. CARMO  2,296,143
POULTRY FEEDER
Filed June 1, 1940  2 Sheets-Sheet 1
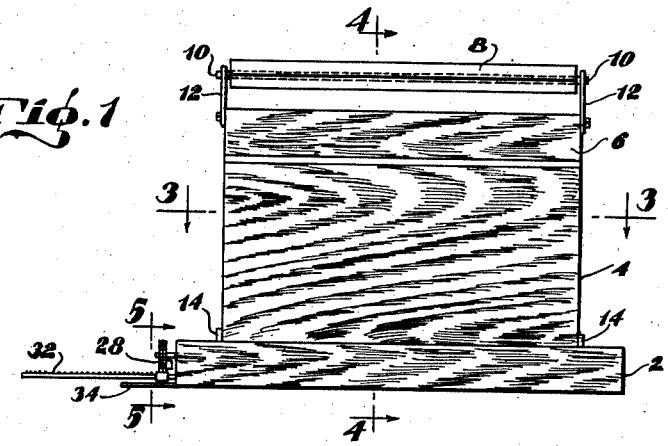
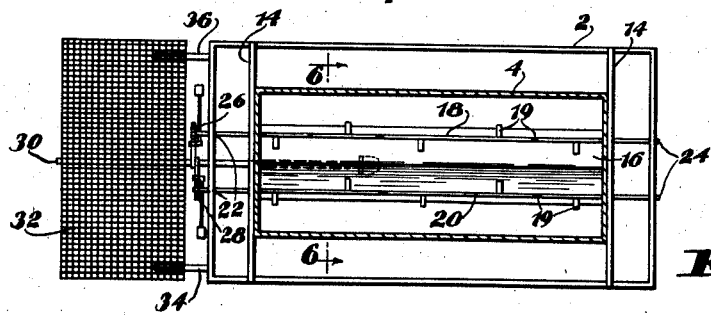
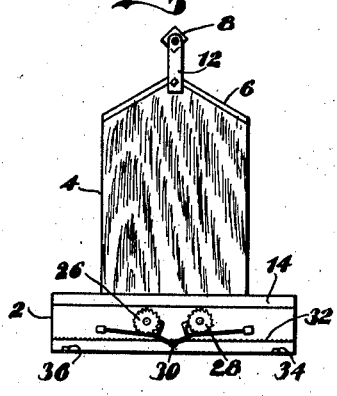
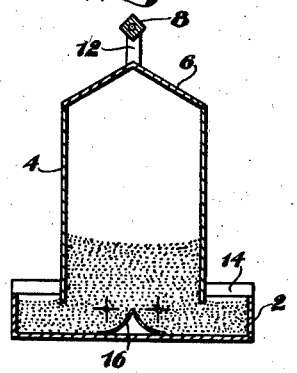
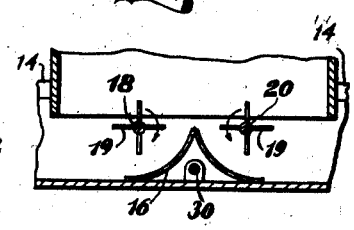
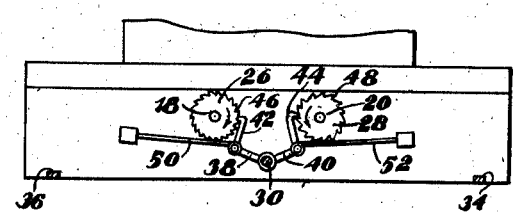
INVENTOR
*John J. Carmo*
BY
*Yardley Chittick*
ATTORNEY Sept. 15, 1942.　　　　J. J. CARMO　　　　2,296,143
POULTRY FEEDER
Filed June 1, 1940　　　　2 Sheets-Sheet 2
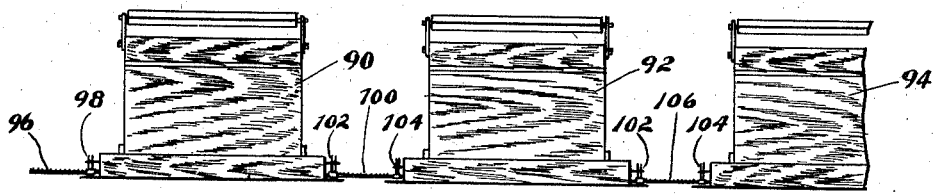
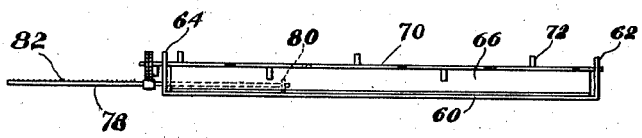
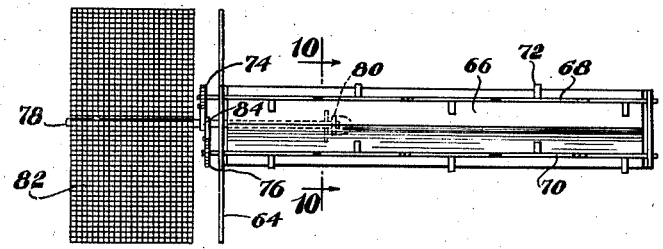
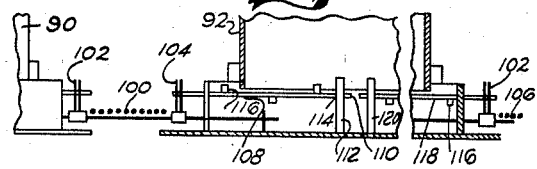
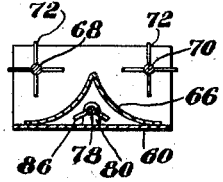
INVENTOR
John J. Carmo
BY C. Yardley Chittick
ATTORNEY Patented Sept. 15, 1942

2,296,143

UNITED STATES PATENT OFFICE 2,296,143

POULTRY FEEDER

John J. Carmo, Billerica, Mass.

Application June 1, 1940, Serial No. 338,317

6 Claims. (Cl. 119—55)

This invention relates to poultry feeders and may be used in connection with the feeding of any type of poultry, whether chickens, ducks, turkeys, or other domestic birds. The invention is directed toward simplified feeding of birds, coupled with bird-operated means for insuring the availability of a continuous supply of feed.

Various types of feeding devices heretofore used have generally included a feed container or hopper located above a feeding trough in such manner that the feed will flow from the hopper laterally to the trough. As the feed is consumed, more enters the trough from the hopper, but because the feed tends to become jammed in the hopper, it is necessary to provide an agitator to insure steady flow.

Heretofore, the agitating means within the hopper has been actuated by the birds themselves through the provision of platforms extending longitudinally along both sides of the trough. Thus, a bird attempting to get some of the feed would hop onto the platform, which would sink under the bird's weight to cause movement of the agitator within the hopper. Usually the oppositely disposed platforms have been connected to each other by a lever, so that when one platform descends, the other platform will be raised. Then, when one or more birds hop on the opposite raised platform, that will descend and the other will go up. This feeding arrangement, however, has proved unsatisfactory, for the reason that birds will continuously hop on and off the platforms, with the result that as the weight distribution changes, the platforms are continuously moving up and down, which disturbs the birds in their feeding, causing them to feed in intermittent and unnatural fashion.

By my invention, these difficulties have been eliminated. I have provided an automatic feeder in which a substantial quantity of feed may be placed at one time within the hopper, to be fed thereafter in gradual fashion to the feeding trough thereunder through the combined result of consumption of the feed by the birds plus agitation of the feed caused by mechanism operated by a single bird, which mechanism is placed in such position that it will be in almost continuous operation under the influence of a succession of individual birds hopping thereon, whereby adequate feed will be provided throughout the length of the trough for the other birds.

My invention further provides automatic feeding means for the birds, in which they may stand on the ground or on a stationary platform and thus be undisturbed while eating.

A further object of my invention is to provide feeding mechanism which will supply feed uniformly over a long trough, but still operable by the weight of a single bird hopping or walking on the controlling platform.

A further object of my invention is to provide an article of manufacture in the form of a unit containing all of the essential mechanical elements of the feeder, which may be utilized in the building of a complete automatic feeder. By the provision of this mechanism, which may be sold separately apart from the trough and the hopper, it becomes possible for the individual or small poultry raiser to complete the construction of an automatic feeder at low cost.

A further object of my invention is to provide an automatic feeder which may be arranged in a long row, the row consisting of a series of troughs and hoppers, with the feed therein agitated to flow laterally into the troughs in suitable quantities under the influence of a series of platform-operated mechanisms placed between the feeding units and actuated by individual birds hopping thereon.

A further object of my invention is the provision of agitating means of novel character operable through the force provided by the weight of a single bird to provide sufficient agitation of the feed in the hopper to cause proper movement to the trough without involving any danger of overflowing.

These and other objects of my invention will become apparent as the description proceeds with the aid of the accompanying drawings, in which:

Fig. 1 is a side elevation of a complete feeding unit.

Fig. 2 is an end elevation looking to the right in Fig. 1.

Fig. 3 is a horizontal section on the line 3—3 of Fig. 1.

Fig. 4 is a section on the line 4—4 of Fig. 1.

Fig. 5 is an enlarged section on the line 5—5 of Fig. 1 showing a detail of the agitating mechanism.

Fig. 6 is an enlarged section on the line 6—6 of Fig. 3, showing the relationship of the agitators to the hopper trough bottom and divider.

Fig. 7 is a side elevation of the invention when used with a plurality of feeders arranged in a row with the bird-controlled agitating mechanism operative to agitate the feed in two aligned feeders.

Fig. 8 shows a side elevation of a unitary feed agitating mechanism about which a complete feeder may be built.

Fig. 9 shows a plan of the unit shown in Fig. 8.

Fig. 10 is a section on the line 10—10 of Fig. 9.

Fig. 11 is a vertical section broken away in part of the agitator construction disclosed in Fig. 7.

Referring now to Fig. 1 the feeder comprises a trough 2 over which is mounted a hopper 4. The trough and hopper may be of any suitable dimensions as long as the relationship is such as to provide adequate feeding space for the birds between the sides of the hopper and the trough.

In practice, a suitable width for the trough is about eighteen inches, while the length may be up to five feet. The hopper width is such as to provide approximately a three inch feeding space along the sides and the ends. It should be understood, however, that the end feeding space is unnecessary and the hopper may be the same length as the trough, the sides providing ample feeding space.

The vertical dimension of the hopper is determined by the amount of feed it is desired to introduce at one time and has no bearing whatsoever on the operation of the device. That is to say, the increased pressure that might be caused at the bottom of the hopper by a greater vertical head does not affect the operation of the agitating mechanism.

Hopper 4 is closed at the top by any suitable removable lid or hinged lid or cover 6, which, in the form shown, is of the peaked roof type designed to discourage perching thereon of the birds. In addition to the peaked roof is a square roller 8 extending the length of the ridge pole, carried by shaft 10 to be rotatable in suitable bearings in the supports 12. This construction effectively prevents birds from perching thereon, and minimizes the likelihood of the feed in the trough being dirtied.

The depth of trough 2 is such that there may be a sufficient depth of feed to provide enough back pressure against that in the hopper so as to stop the movement of feed from the hopper to the sides of the trough, even though the agitators may be in operation, until such time as the feed level has been lowered by consumption by the birds to a point where additional feed may be ejected from the hopper.

The hopper may be supported above the trough in any convenient manner. One suitable means are cross bars 14 fastened to the ends of the hopper and extending the width of the trough to rest on the trough sides. The vertical distance of the bottom of the hopper from the bottom of the trought is not critical, provided it is close enough so that feed cannot run out freely to overflow the trough sides. A suitable distance in the average case will be about two to two and a half inches.

To facilitate lateral movement of the feed from the hopper, a divider 16 is provided which extends longitudinally of the trough throughout the length of the hopper. This facilitates the lateral distribution of the feed under the influence of the agitators and eliminates dead spots.

The agitating mechanism comprises a pair of longitudinally extending shafts 18 and 20 which extend through the ends of the trough, as at 22 and 24. The trough ends act as bearings, although special bearings might be provided. The shafts 18 and 20 do not need to extend through the end of the trough 2, as at 24, but may be supported by bearings within the confines of the trough. This, however, is a matter of mechanical detail and convenience.

Located at intervals along shafts 18 and 20 are short agitator blades 19 spaced perhaps two inches apart along the shaft, the blades being set at a progressive angular relationship of ninety degrees. The number and angular relationship of the blades may be varied, but I have found satisfactory results with blades approximately ¾ inch long and ⅜ inch wide, arranged to come within effective distance of the divider 16. When shaft 18 is rotated clockwise and shaft 20 counterclockwise, as shown in Fig. 6, to a suitable extent, the distribution of feed to the trough sides will be satisfactory.

Shafts 18 and 20 carry at or adjacent their outer ends ratchets 26 and 28 respectively. These are shown in detail in Fig. 5.

A rock shaft 30 also extends from the end of the trough, in which it is rotatably maintained by suitable bearings, and to this rock shaft is secured a transversely extending platform 32. This platform is preferably no wider than the width of the trough and may be narrower, if the leverage conditions relating to rotation of the agitator shafts 18 and 20 are suitable.

The width of the platform should be in the neighborhood of nine inches, whereby a suitable walking space for a single bird may be provided. In order to limit the oscillation of platform 32, suitable stops are provided which may take the form of bars 34 and 36 extending from the end of the trough.

As shown in Fig. 5, ratchets 26 and 28 are provided to be operated by oscillation of rock shaft 20 whereby intermittent rotation of shafts 18 and 20 may be effected. This mechanism comprises arms 38 and 40 secured to and extending from rock shaft 30 and which have pivotally mounted on their ends pawls 42 and 44, which pawls engage teeth 46 and 48 of ratchets 26 and 28 respectively. Connected to the pawls are weighted arms 50 and 52 adequate to urge pawls 42 and 44 continuously against teeth 46 and 48.

As rock shaft 30 is rotated to the left, arm 38 moves downwardly, carrying with it pawl 42, thereby rotating ratchet 26 a limited amount. At the same time arm 40 rises, causing pawl 44 to slide upwardly over one or more teeth 48. When the motion of the rock shaft 30 is reversed, with arm 38 rising and arm 40 descending, pawl 42 will slide over teeth 46 to get a new grip, while ratchet 28 will be rotated counterclockwise a limited amount. Thus, as rock shaft 30 is ocillated, there will be intermittent rotation of shafts 18 and 20 in opposite directions, with one shaft rotating while the other is stationary.

As previously pointed out, oscillation of rock shaft 30 is effected by the movement of platform 32 secured thereto, and this in turn is controlled by the movement of a single bird thereon.

One of the characteristics of poultry is their inclination to hop onto any convenient platform. As a result, platform 32 will be hopped upon almost continuously by a succession of birds. Under the law of averages, the birds will hop first on one end, then on the other, or a single bird may walk across the platform. In any event, it has been found that the single platform located at the end of the trough away from the normal side feeding positions provides sufficient attraction to keep the agitating mechanism in almost constant operation, whereby there will be supplied to the trough sides an adequate quantity of feed at all times.

As previously pointed out, failure of the birds to eat the feed as rapidly as the agitating mechanism would normally cause it to be distributed does not result in an overflow of the trough, even though the agitators are kept in action by a succession of birds walking on platform 32, by virtue of the fact that the trough sides are high enough so that when the feed has risen to a certain point, the back pressure against the hopper supply will be adequate to prevent any further advance of the feed. In such situations the blades 19 rotate in the feed and agitate it, but do not exert sufficient downward force to cause any further outward movement until the feed level in the trough sides has been reduced.

While the description of the invention heretofore has related to the complete feeder including the trough, hopper and agitating mechanism, I have found that in many instances it would be more convenient for the user to build his own trough and hopper, utilizing therewith an independently constructed agitating mechanism. I have therefore provided a construction of the agitating mechanism, including the bird platform, which may be made and sold as a separate unit to be incorporated later by the user in a complete feeder. This arrangement has certain advantages in that the cost of a complete unit may be reduced and the shipping charges that would be attendant upon shipment of a complete feeder largely eliminated.

One form of a suitable agitating unit is shown in elevation in Fig. 8 and in plan in Fig. 9. In this construction there is a base 60 having upturned ends 62 and 64. This may be made of any suitable material, but in the preferred form it is preferably made of heavy galvanized sheet steel. The bottom 60 may be either the full width of the trough to be built or it may be of limited width, as shown. Likewise, the upturned ends may be narrow, as 62, or wide, as 64. In any event, the bottom and ends can be incorporated in a trough to be built by the user.

Extending longitudinally and mounted on base 60 is a divided 66 which may be spot-welded, bolted or otherwise secured to base 60. The ends 62 and 64 are perforated at suitable aligned points to provide bearings for shafts 68 and 70, which shafts are similar to shafts 18 and 20, heretofore described, and carry agitator blades 72. Shafts 68 and 70 extend beyond end 64 and have mounted thereon ratchets 74 and 76 similar to ratchets 26 and 28. A rock shaft 78 mounted in a bearing 80, secured to base 60 and extending through aligned apertures in ends 64, carries a platform 82 similar to platform 32. Pawl mechanism 84 is connected to rock shaft 78 to cause intermittent rotation of shafts 68 and 70 upon oscillation of platform 82. To limit the movement of platform 82, stop means 86 may be attached to rock shaft 78, which, upon engagement with base 60, will limit the movement thereof.

For shipping purposes, the foregoing construction may be made demountable. That is, platform 82 may be removable from rock shaft 78 and the shaft in turn may be removed from its extended position. These features, however, are matters of mechanical expediency and may be altered to meet manufacturing, shipping or sales requirements.

A user with the foregoing unitary agitating construction available may easily make a trough with the agitator mechanism extending longitudinally therein, and above it may position any suitable hopper, the arrangement being such, of course, that the open end of the hopper is close enough to the bottom of the trough and located symmetrically over the agitators.

In situations where large numbers of birds have to be fed and which would require a considerable number of feeders, I have found it desirable to arrange a plurality of feeders in a continuous row, but so spaced to permit the inclusion of a single platform between each pair of feeders. Such an arrangement is shown in Fig. 7, in which there are arranged in a row feeders 90, 92 and 94. Feeder 90, at its left end, has associated therewith a movable platform 96, which through ratchet and pawl mechanism 98, similar to that already described, operates agitator mechanism that may extend half the length of feeder 90. Platform 100, positioned between feeders 90 and 92, operates ratchet and pawl mechanisms 102 and 104, thereby causing movement of two agitators, one extending the other half of feeder 90 and the other extending half the length of feeder 92. Similarly, platform 106, positioned between feeders 92 and 94, will operate two agitators, one extending into feeder 92 and the other into feeder 94. The end feeders terminate with platforms, as 96, operating agitator mechanism in that feeder only.

In Fig. 11 is disclosed a broken away section of feeder 92, showing the manner in which the intervening platforms may operate agitators extending part of the length of the feeders to which the platform is related.

Platform 100 through the ratchet and pawl mechanism 104 operates a shaft 108 which may extend only a portion of the length of the feed trough, terminating as at 110. The inner end of this shortened shaft may be supported by a vertical member 112 having a longitudinally extending hole therethrough in which the shaft 108 may be positioned for suitable support. Shaft 108 carries agitator blades 116.

Platform 106 at the other end of feeder 92 operates through ratchet and pawl mechanism 102 a separate shaft 118 which may extend to a position close enough to the end of the shaft 108 so that the feed may be properly agitated. The end of shaft 118 may be carried by a support 120 in the same manner that the inner end of shaft 108 is supported.

Platform 100 also operates a shaft in feeder 90 similar to shaft 118, while platform 106 operates another shaft in feeder 94 similar to shaft 108.

From the foregoing explanation it can be seen that a bird walking on platform 100 will cause agitation of feed in the adjacent portions of the troughs of feeders 90 and 92, while a bird walking on platform 106 will cause agitation of feed to the adjacent portions of the troughs of feeders 92 and 94. In this manner, feed will be made available in opposite directions from the platform that may be agitated, thus promoting feeding.

By this arrangement, a bird walking on a platform positioned between two feeders will induce movement of feed into troughs on both sides of the platform, thus insuring the availability of feed in both directions. This construction promotes uniformity of supply throughout the entire row of feeders.

While preferred forms of my invention have been disclosed and explained, I wish it to be distinctly understood, however, that I do not intend to be limited thereby, but only by the appended claims.

I claim:

1. A poultry feeder comprising a feed trough, a feed hopper positioned over said trough, a rock shaft extending from one end of said trough, a platform carried by said rock shaft of an area sufficient to readily accommodate a single bird thereon, means for limiting the angular movement of said platform whereby said platform may be moved by a single bird walking thereon, feed agitating mechanism positioned under said feed hopper, and means operated by movement of said platform for causing movement of said agitating mechanism when said platform is moved through a limited distance.

2. A poultry feeder as set forth in claim 1, in which said agitating mechanism comprises two longitudinally extending and rotatable shafts, each having agitator blades thereon, a longitudinally extending divider in said trough with its upper portion intermediate said shafts, and means for causing intermittent alternate rotation of said shafts in opposite directions upon movement of said platform under the influence of the weight of a bird thereon.

3. A feed trough and hopper, agitator mechanism positioned in the path of feed coming from said hopper, means for causing movement of said agitator mechanism comprising a bird platform movable in alternate directions through a limited distance and located at one end of said trough away from the principal feeding areas, said platform supported by a rock shaft, and means operated by movement of said rock shaft to cause movement of said agitator mechanism.

4. A plurality of feeders arranged in a row, each feeder comprising a trough and a hopper positioned thereover, a movable platform positioned between each pair of feeders, and agitating mechanism within said trough and in the path of feed supply from said hopper, each of the platforms positioned between a pair of feeders having means associated therewith to cause movement of agitator mechanism in both of the feeders between which said platform is positioned upon movement of said platform.

5. A rectangular feed trough and hopper, fixed in relation to each other, said hopper having an elongated rectangular bottom opening, agitator mechanism extending the entire length of said opening and positioned in the path of feed coming from said hopper, a shaft connected to said agitator mechanism and extending away from one end of said trough, and a single platform adjacent said trough and connected to said shaft and rotatably movable in alternate directions through a limited distance to cause movement of said agitator mechanism.

6. A rectangular feed trough and hopper, fixed in relation to each other, said hopper having an elongated rectangular bottom opening, agitator mechanism extending the entire length of said opening and positioned in the path of feed coming from said hopper, means for causing movement of said agitator mechanism comprising a platform connected to and supported by a shaft extending from one end of said feed trough, said platform being capable of oscillating movement under the influence of a bird walking thereon, means limiting the angular movement of said platform, and means for translating movement of said shaft to said agitator mechanism.

JOHN J. CARMO.